(12) United States Patent
Gottschalk-Gaudig et al.

(10) Patent No.: US 8,470,443 B2
(45) Date of Patent: Jun. 25, 2013

(54) HYDROPHOBICIZATION OF SILICAS UNDER OXIDIZING CONDITIONS

(75) Inventors: Torsten Gottschalk-Gaudig, Mehring (DE); Michael Lucarelli, McMurray, PA (US)

(73) Assignee: Wacker Chemie AG, Munich (DE)

( * ) Notice: Subject to any disclaimer, the term of this patent is extended or adjusted under 35 U.S.C. 154(b) by 386 days.

(21) Appl. No.: 12/808,788

(22) PCT Filed: Dec. 12, 2008

(86) PCT No.: PCT/EP2008/067377
§ 371 (c)(1),
(2), (4) Date: Jun. 17, 2010

(87) PCT Pub. No.: WO2009/077437
PCT Pub. Date: Jun. 25, 2009

(65) Prior Publication Data
US 2010/0263574 A1  Oct. 21, 2010

(30) Foreign Application Priority Data

Dec. 19, 2007  (DE) .................. 10 2007 055 879

(51) Int. Cl.
*B32B 27/28* (2006.01)
(52) U.S. Cl.
USPC ........................................... 428/405

(58) Field of Classification Search
USPC .......................................................... 428/405
See application file for complete search history.

(56) References Cited

U.S. PATENT DOCUMENTS

| | | | |
|---|---|---|---|
| 3,924,029 A | 12/1975 | Schutte et al. | |
| 5,686,054 A | 11/1997 | Barthel et al. | |
| 5,851,715 A * | 12/1998 | Barthel et al. | 430/108.3 |
| 6,316,050 B1 | 11/2001 | Troll et al. | |
| 2007/0187313 A1* | 8/2007 | Ekeroth | 210/198.2 |

FOREIGN PATENT DOCUMENTS

| | | |
|---|---|---|
| DE | 1163784 | 2/1964 |
| DE | 4419234 A1 | 12/1995 |
| EP | 0686676 A1 | 12/1995 |
| EP | 0924269 A1 | 6/1999 |
| WO | 2006010764 A1 | 2/2006 |

OTHER PUBLICATIONS

G.W. Sears, Jr., "Determination of Specific Surface Area of Colloidal Silica by Titration with Sodium Hydroxide", Analytical Chemistry, vol. 28, No. 12, Dec. 1956, pp. 1981-1983.

* cited by examiner

*Primary Examiner* — Margaret Moore
(74) *Attorney, Agent, or Firm* — Brooks Kushman P.C.

(57) ABSTRACT

Modified silicas having low silanol content which are compatible with polar compositions are prepared by modifying silica with a difunctional reactive organosilane or polydialkylsiloxane under oxidizing conditions below 400° C. The silicas have a distinct proportion of $T^1$, $T^2$, and $T^3$ groups.

18 Claims, No Drawings

HYDROPHOBICIZATION OF SILICAS UNDER OXIDIZING CONDITIONS

CROSS-REFERENCE TO RELATED APPLICATION

This application is the U.S. national phase of PCT Appln. No. PCT/EP2008/067377 filed Dec. 12, 2008 which claims priority to German application DE 10 2007 055 879.3 filed Dec. 19, 2007.

BACKGROUND OF THE INVENTION

1. Field of the Invention

The invention relates to a process for the preparation of hydrophobic silicas.

2. Description of the Related Art

The surface modification of finely divided silicas with dimethyldichlorosilane in a fluidized bed is known (DE 1163784). Here, hydrophobic silicas which, in addition to a considerable proportion of unreacted silica silanol groups, have a highly hydrophobic surface modification are obtained. With the use of these silicas, for example for rheology control of polar coatings or adhesives and sealants, this can lead to an extended incorporation time into the formulations in spite of unreacted silanol groups. Furthermore, the process is uneconomical owing to the high temperatures required.

The modification of finely divided silicas with sparingly volatile siloxanes is furthermore known (EP 686676). Here, highly hydrophobic silicas having a very small proportion of unreacted silanol groups are obtained. In polar coating materials, adhesives or sealants, the highly nonpolar surface siloxane layer can lead to more difficult wetting of the particles and, associated therewith, to an extended incorporation time of silicas into the liquid medium.

EP 924269 discloses the surface modification of silicas with dimethyldisilyloxy groups and monomethyltrisilyloxy groups. Here, cyclic siloxanes are reacted with silica at high temperatures (550-600° C.). Silicas having a high carbon content, i.e. better hydrophobization of the silica, result. The particles described there have a higher methanol number, i.e. a low polarity, compared with particles which were reacted at low temperature. Reaction at high temperatures is uneconomical owing to the energy costs. A disadvantage of these particles is that, although they have a lower proportion of surface silanol groups, they simultaneously also have a higher methanol number, i.e. a higher hydrophobicity.

The cosilylation of silica with dimethyldichlorosilane and methyltrichlorosilane is also known. What is problematic here is the substantially different reactivity of the silanes, which can lead to an inhomogeneous distribution of D and T groups, and the formation of large amounts of HCl, which has to be removed from the product by purification.

SUMMARY OF THE INVENTION

It was the object to improve the prior art, in particular to develop a silica and a process that leads to silica particles which have a relatively polar surface modification in combination with unchanged or even low residual silanol content in comparison with hydrophobic silicas obtained by known processes. These and other objects are achieved by reaction of silica particles with silanes of the formula $R_2SiX_2$ where X is a reactive group such as alkoxy, silanol, or halo, or with a polydialkylsiloxane.

DETAILED DESCRIPTION OF THE PREFERRED EMBODIMENTS

The invention thus relates to silicas which are modified with groups of the general formulae (I) and (II)

$$R_2Si(O\text{---})_2 \qquad (I)$$

$$RSi(O\text{-})_3 \qquad (II)$$

in which
R is a monovalent, optionally mono- or polyunsaturated, optionally branched hydrocarbon radical having 1 to 24 C atoms,
the relative proportion of the T groups comprising $T^1$, $T^2$ and $T^3$ groups, based on the total organosilicon groups of the silica, being greater than 0.1%, where the proportion of $T^1$ groups $(F_{T1}=I_{T1}/(I_{T1}+I_{T2}+I_{T3}))$ is less than 10% and the relative proportion of $T^2$ groups $(F_{T2}=I_{T2}/(I_{T1}+I_{T2}+I_{T3}))$ is greater than 5%.

Surprisingly and in no way to be foreseen by one skilled in the art, it has now been found that a surface-modifying layer, produced by the process according to the invention, having dimethyldisilyloxy groups and monomethyltrisilyloxy groups, leads to silicas having a low proportion of unreacted surface silanol groups in combination with a surface-modifying layer which is not relatively polar. Silicas are reacted with dialkyldihalo- or dialkyldialkoxysilanes or polydimethylsiloxanes (PDMS) under oxidizing conditions, i.e. for example in air at temperatures of less than 400° C. Under these reaction conditions, relatively polar SiOH-containing siloxane chains form. The SiOH groups can be detected by means of $^{29}$Si-CMPAS-NMR spectroscopy as $T^2$ groups.

A T group is understood as meaning a monoalkyltrisilyloxy group R—Si(O—)$_2$, where the superscript number indicates the number of siloxane bonds, i.e.

$T^1$: R—Si(OR')$_2$—O—Si
$T^2$: R—Si(OR')(—O—Si)$_2$
$T^3$: R—Si(—O—Si)$_3$, in which R may be an Si—C-bonded, optionally arbitrarily substituted alkyl radical and R' may be an alkyl group or a hydrogen atom.

Analogously, a D group is understood as meaning a dialkyldisilyloxy group (R—)$_2$Si(O—)$_2$.

The silicas obtained according to the invention are modified with groups of the general formulae (I) and (II)

$$R_2Si(O\text{---})_2 \qquad (I)$$

$$RSi(O\text{---})_3 \qquad (II)$$

in which R is a monovalent, optionally mono- or polyunsaturated, optionally branched hydrocarbon radical having 1 to 24 C atoms.

Radicals R are preferably alkyl radicals such as methyl, ethyl, and propyl radicals, hexyl radicals such as n-hexyl or isohexyl, octyl radicals such as n-octyl or isooctyl, and n-dodecyl, n-hexadecyl or n-octadecyl radicals. The methyl radical is particularly preferred.

Preferred groups on the silica surface are the dimethylsilyldioxy group (CH$_3$)$_2$Si(O—)$_2$ and the methylsilyltrioxy group CH$_3$Si(O—)$_3$.

The silica surface of the silicas obtained according to the invention is simultaneously modified with both groups of the general formulae (I) (=D groups) and (II) (=T groups). Preferably, the relative proportion of the T groups, based on the total organosilicon groups of the silica, is preferably greater than 0.1%, more preferably from 0.1% to 30%, preferably from 0.5% to 20% and, in a specific embodiment, from 1% to 10%. The individual proportions of the total organosilicon groups can be obtained, for example, by means of integration of the corresponding signal intensities of a $^{29}$Si-CPMAS-NMR spectrum, i.e. $F_T=I_T/(I_T+I_D)$, in which $F_T$ is the proportion of T groups and $I_T$ and $I_D$ are the NMR signal intensities of the T groups and D groups, respectively.

The T groups of the silicas obtained according to the invention are composed of $T^1$, $T^2$ and $T^3$ groups. The proportion of $T^1$ groups ($F_{T1}=I_{T1}/(I_{T1}+I_{T2}+I_{T3})$) is preferably less than 10%, more preferably less than 5%, yet more preferably less than 1% and in a specific embodiment, no $T^1$ groups can be detected.

The relative proportion of $T^2$ groups ($F_{T2}=I_{T2}/(I_{T1}+I_{T2}+I_{T3})$) is preferably greater than 5%, more preferably from 5% to 75%, and most preferably from 10% to 50%.

The silicas obtained according to the invention have a low proportion of unreacted surface silanol groups compared with silicas which were reacted with identical amounts of silylating agents but under inert gas. Preferably, the proportion of unreacted surface silanol groups is up to 90% lower, preferably up to 75% and most preferably up to 50% lower than in the case of silicas which were reacted with identical amounts of silylating agents but under inert gas.

The silicas obtained according to the invention have the same or a lower methanol number than silicas which were reacted with identical amounts of silylating agents but under inert gas. Preferably, the methanol number is up to 50% lower, more preferably up to 25% lower, and most preferably up to 20% lower than in the case of silicas which were reacted with identical amounts of silylating agent but under inert gas.

The silicas obtained according to the invention have a carbon content of greater than 0.1% by weight, preferably a carbon content of from 0.1% by weight to 10% by weight and most preferably a carbon content of from 0.5% by weight to 7.5% by weight.

The silicas obtained according to the invention have a low proportion of extractable organosilicon constituents. Preferably, this proportion is less than 10% by weight, more preferably less than 5% by weight.

The silicas obtained according to the invention have a DBP number of preferably less than 300, more preferably of 250-100 and most preferably of 225-150.

The silicas obtained according to the invention have a high specific surface area (according to DIN EN ISO 9227/DIN 66132). Preferably, the specific surface area is from 10 m2/g to 450 m2/g, more preferably from 20 m2/g to 400 m2/g and most preferably from 30 m2/g to 350 m2/g The invention furthermore relates to a process for the preparation of a silica modified with the groups of the general formula (I) and (II), the hydrophilic silica being reacted with silanes of the general formula III

$$R_2SiX_2 \quad (III)$$

in which X is halogen, OH or OR and R has the abovementioned meaning,
or with siloxanes of the general formula (IV)

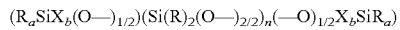
$$(R_aSiX_b(O-)_{1/2})(Si(R)_2(O-)_{2/2})_n(-O)_{1/2}X_bSiR_a)$$

in which X and R have the abovementioned meaning and
a is 2 or 3,
b is 0 or 1, with the proviso that a+b=3,
n is from 1 to $10^4$, preferably from 1 to 1000, particularly preferably from 3 to 100, the viscosity of the polysiloxanes used being greater than 0.5 mPa·s, preferably 1 mPa·s-$10^6$ mPa·s and most preferably 1 mPa·s-1000 mPa·s,
or with any desired mixtures of the silanes of the general formula (III) and/or siloxanes of the general formula (IV), with the proviso that modification is effected at temperatures below 400° C. and under oxidizing conditions, for example in the presence of air, oxygen or nitrous oxide.

The surface-modified silica can be prepared in continuous or batchwise processes; the process for modification may be composed of one or more steps. Preferably, the surface-modified silica is prepared by means of a method in which the preparation process is effected in separate steps: (A) first, preparation of the hydrophilic silica, (B) the modification of the silica by (1) loading of the hydrophilic silica with silanes of the general formula (III) or with siloxanes of the general formula (IV) or with any desired mixtures of the silanes of the general formula (III) and/or siloxanes of the general formula (IV),
(2) reaction of the silica with the applied compounds and (C) purification of the silica to remove excess applied compounds and byproducts.

The surface treatment is preferably carried out in an atmosphere which leads to partial oxidation of the modified silica, i.e. preferably nitrous oxide, oxygen or air, preferably more than 5% by volume of oxygen, more preferably more than 10% by volume of oxygen, and most preferably in air.

Loading, reaction and purification can be carried out as a batchwise or continuous process.

For technical reasons, a continuous reaction procedure is preferred.

The loading (step B1) is preferably effected at temperatures below 400° C., more preferably from −30 to 250° C., yet more preferably from 20 to 150° C., and still more preferably at from 20 to 80° C. In a very particularly preferred embodiment, the loading step is effected at from 30 to 50° C.

The residence time is preferably 1 min-24 h, preferably from 15 min to 300 min, and for reasons relating to the space-time yield, most preferably from 15 min to 240 min.

The pressure during loading preferably ranges from slightly reduced pressure to 0.2 bar up to super-atmospheric pressure of 100 bar, normal pressure, i.e. a pressureless procedure, being preferred over external/atmospheric pressure for technical reasons.

The silanes of general formula III or siloxanes of the general formula IV are preferably added in liquid form and in particular mixed with the pulverulent silica. The compounds can be admixed in pure form or as solutions in known industrially used solvents, for example, alcohols such as methanol, ethanol or isopropanol, ethers such as diethyl ether, THF or dioxane, or hydrocarbons such as hexanes or toluene. The concentration in the solution is preferably 5-95% by weight, more preferably 30-95% by weight, and most preferably 50-95% by weight.

The admixing is preferably effected by nozzle techniques or comparable techniques such as effective atomization techniques, for example atomization in 1-fluid nozzles under pressure (preferably from 5 to 20 bar), spraying in 2-fluid nozzles under pressure (preferably gas and liquid, 2-20 bar), very fine distribution using atomizers or gas-solid exchange units with movable, rotating or static internals which permit a homogeneous distribution of the silanes of the general formula III or siloxanes of general formula IV with the pulverulent silica. The aerosol can be sprayed from above onto the fluidized solid or sprayed into the fluidized solid. Preferably, the silanes of the general formula III or siloxanes of the general formula IV are added as a very finely divided aerosol, characterized in that the aerosol has a settling rate of 0.1-20 cm/s.

The aerosol can be sprayed from above onto the fluidized solid or sprayed into the fluidized solid.

Preferably, the silanes of the general formula III or siloxanes of the general formula IV are added as very finely divided aerosol, characterized in that the aerosol has a settling rate of 0.1-20 cm/s.

If the silanes of the general formula III or siloxanes of the general formula IV are compounds which can be vaporized without decomposition, i.e. compounds whose boiling point at atmospheric pressure is less than 200° C., these are preferably mixed in the form of a vapor with the pulverulent silica.

Optionally, protic solvents can be added to the silanes of the general formula III or siloxanes of the general formula IV, such as liquid or vaporized alcohols or water; typical alcohols are isopropanol, ethanol and methanol. Mixtures of the abovementioned protic solvents may also be added. Preferably, from 1 to 50% by weight of protic solvents, based on the silica, are added, more preferably from 5 to 25% by weight. Water is particularly preferred.

Alternatively, acidic catalysts, of acidic character in the sense of a Lewis acid or of a Brönsted acid, such as hydrogen chloride, or basic catalysts, of basic character in the sense of a Lewis base or of a Brönsted base, such as ammonia or amines such as triethylamine, may furthermore be added. These are preferably added in traces, i.e. less than 1000 ppm. Most preferably, no catalysts are added.

Preferably, the loading of the silica and the reaction with the silanes of the general formula III or with siloxanes of the general formula IV are effected with mechanical or gas-supported fluidization.

A gas-supported fluidization can be effected by inert or oxygen-containing process gases; preferably, the fluidization is effected by air. Gases for fluidization are preferably fed in the range of superficial velocities of from 0.05 to 5 cm/s, more preferably 0.5-2.5 cm/s.

Mechanical fluidization, which is effected without additional use of emerging gas, by means of paddle stirrers, anchor stirrers and other suitable stirring elements, is particularly preferred.

The reaction (step B2) is preferably effected at temperatures of less than 400° C., more preferably at temperatures of 20-380° C., yet more preferably at 100-350° C. and most preferably at 150-350° C.

The purification (step C) is preferably effected at a purification temperature of from 20° C. to 400° C., more preferably from 50° C. to 350° C., and most preferably from 100° C. to 300° C.

The purification step is preferably characterized by movement, slow movement and slight mixing being particularly preferred. The stirring elements are advantageously adjusted and moved so that mixing and fluidization, but not complete vortexing, preferably occur.

The purification step may furthermore be characterized by a high gas input, preferably corresponding to a superficial velocity of from 0.001 to 10 cm/s, more preferably from 0.01 to 1 cm/s. This can be effected by all inert gases which do not react with the silanes of the general formula II, the silica and the modified silica, i.e. do not lead to secondary reactions, degradation reactions, oxidation processes and flame and explosion phenomena, preferably, $N_2$, Ar, other noble gases, $CO_2$, etc., or by oxygen-containing gases, preferably air.

In a particularly preferred embodiment, unreacted silanes of the general formula III or siloxanes of the general formula IV and exit gases are recycled from the purification step into the step for loading the silica; this can be effected partly or completely, preferably to 10-90% of the total volume flow of the gas volumes emerging from the purification, and is effected in suitably thermostated apparatuses. The recycling is preferably effected in the non-condensed phase, i.e. as gas or as vapor. The recycling can be effected as mass transfer along a pressure equilibration or as controlled mass transfer with the technically customary systems for gas transport, such as fans, pumps, or compressed-air diaphragm pumps. Since the recycling of the non-condensed phase is preferred, heating of the recycle pipes may be advisable.

The recycling of the unreacted silanes of the general formula III or siloxanes of the general formula IV and of the exit gases may be preferably from 5 to 100% by weight, based on the total mass thereof, more preferably from 30 to 80% by weight. The recycling may be from 1 to 200 parts, preferably from 10 to 30 parts, based on 100 parts of freshly used silane.

The recycling of the purification products of the modification reaction into the loading is preferably effected continuously.

In addition, methods for mechanical compaction of the silica may be used during modification or after the purification, such as, for example, press rolls, milling units such as edge mills and ball mills, continuous or batchwise, compaction by screws or screw mixers, screw compactors, briquetters or compaction by extraction of the air or gas content by means of suitable vacuum methods.

Most preferably, mechanical compaction is effected during modification, in step (II) of the reaction, by press rolls, the above-mentioned milling units such as ball mills, or compaction by screws, screw mixers, screw compactors or briquetters.

In a further particularly preferred procedure, methods for mechanical compaction of the silica, such as compaction by extraction of the air or gas content by suitable vacuum methods or press rolls or combinations of the two methods, are used after the purification.

In addition, in a particularly preferred procedure, methods for deagglomeration of the silica, such as pinned-disk mills, hammer mills, countercurrent mills, impact mills or apparatuses for combined milling and classification, can be used after the purification.

The invention furthermore relates to a method for using the silicas obtained according to the invention in systems of low to high polarity as a viscosity-imparting component. This refers to all solvent-free, solvent-containing, film-forming surface coating materials, rubber-like to hard coatings, adhesives, sealing and potting compounds and other comparable systems.

The silicas according to the invention can be used, for example, in systems such as:
  epoxide systems
  polyurethane systems (PU)
  vinyl ester resins
  unsaturated polyester resins
  low-solvent resin systems, so-called "high solids"
  solvent-free resins which are applied in powder form, for example as coating materials.

As rheological additives in these systems, the silicas according to the invention give the required necessary viscosity, structural viscosity, thixotropic character and a flow limit sufficient for non-sag behavior on perpendicular surfaces.

The invention furthermore relates to the use of the silicas obtained according to the invention in catalytically crosslinking coatings, adhesives or sealants, for example, 1-component systems, such as moisture-crosslinking 1-component polyurethane adhesives or coating materials, for improving the storage stability of the uncrosslinked formulation. The silicas according to the invention are distinguished by a retardation of the catalysts usually used. Typically used catalysts are, for example, basic compounds such as amines, for example, triethylamine, ethylenediamines, triethylenediamine, morpholines such as N-alkylmorpholines, piperazine and derivatives thereof, or pyridine and derivatives thereof, or organometallic compounds, such as organotin compounds such as dibutyltin dilaurate, tributyltin acetate, dibutyltin dichloride or tin octanoate, or other organometallic compounds such as cobalt compounds, for example cobalt benzoate, or cobalt octanoate, or cobalt naphthenate, or titanium compounds such as dibutyltitanium dichloride, or iron compounds such as iron octanoate.

The proportion of the silicas according to the invention is preferably from 0.1 to 20% by weight, more preferably from 0.5 to 15% by weight and most preferably from 1 to 10% by weight, based on the total weight of the formulation. This means that, in a thermal loading test at 80° C., moisture-crosslinking catalyzed 1-component polyurethane adhesives or coating materials containing the silicas according to the invention have a substantially slower increase in viscosity compared with 1-component polyurethane adhesives or coating materials containing hydrophobic silicas without the T group fraction according to the invention. Preferably, the time span to reaching a viscosity which is twice as high in comparison with the starting viscosity is increased by a factor of 10, preferably by a factor of 5 and more preferably by a factor of 2.

The silicas obtained according to the invention may furthermore be used specifically as a rheological additive and reinforcing filler in uncrosslinked and crosslinked silicone systems, such as silicone elastomers, which consist of silicone polymers such as polydimethylsiloxanes, fillers and further additives. These may be crosslinked, for example, with peroxides or may be crosslinked via addition reactions, the so-called hydrosilylation reaction, between olefinic groups and Si—H groups, or via condensation reactions between silanol groups, for example those which form under the action of water.

The silicas obtained according to the invention can be used for improving and controlling the powder flow behavior and/or for regulating and controlling the triboelectric charge properties of toners or developers. Such toners and developers can preferably be used in electrophotographic printing processes and they can also be employed in direct image transfer processes. The same also applies to the use in powder coatings.

EXAMPLES

Example 1

16 g of a trimethylsiloxy-terminated silicone oil having a viscosity of 25 mPa·s at 25° C. are added at a temperature of 25° C., under $N_2$ inert gas, to 100 g of hydrophilic silica having a moisture content of less than 1% and an HCl content of less than 100 ppm and having a specific surface area of 150 $m^2/g$ (measured by the BET method according to DIN EN ISO 9227/DIN 66132) (obtainable under the name HDK® V15 from Wacker-Chemie AG, Munich, Germany), by means of atomization via a two-fluid nozzle (pressure 5 bar). The silica loaded in this manner is reacted for 2 h at 300° C. in a 100 l dry oven in an air stream of 900 l/h.

The analytical data are shown in table 1.

Example C2 (Comparative Example)

16 g of a trimethylsiloxy-terminated silicone oil ($F_T/\%=0$) having a viscosity of 20 mPa·s at 25° C. are added at a temperature of 25° C., under $N_2$ inert gas, to 100 g of hydrophilic silica having a moisture content of less than 1% and an HCl content of less than 100 ppm and having a specific surface area of 150 $m^2/g$ (measured by the BET method according to DIN EN ISO 9227/DIN 66132) (obtainable under the name HDK® V15 from Wacker-Chemie AG, Munich, Germany), by means of atomization via a two-fluid nozzle (pressure 5 bar). The silica loaded in this manner is reacted for 2 h at 300° C. in a 100 l dry oven in an $N_2$ stream of 900 l/h.

The analytical data are shown in table 1.

Example 3

27 g of an OH-terminated silicone oil having a viscosity of about 35 mPa·s at 25° C. are added at a temperature of 25° C., under $N_2$ inert gas, to 100 g of hydrophilic silica having a moisture content of less than 1% and an HCl content of less than 100 ppm and having a specific surface area of 300 $m^2/g$ (measured by the BET method according to DIN EN ISO 9227/DIN 66132) (obtainable under the name HDK® T30 from Wacker-Chemie AG, Munich, Germany), by means of atomization via a two-fluid nozzle (pressure 5 bar). The silica loaded in this manner is reacted for 2 h at 300° C. in a 100 l dry oven in an air stream of 900 l/h.

The analytical data are shown in table 1.

Example 4

1.89 g of demineralized water and then 6.4 g of dimethyldichlorosilane are added at a temperature of 25° C., under $N_2$ inert gas, to 100 g of hydrophilic silica having a moisture content of less than 1% and an HCl content of less than 100 ppm and having a specific surface area of 150 $m^2/g$ (measured by the BET method according to DIN EN ISO 9227/DIN 66132) (obtainable under the name HDK® V15 from Wacker-Chemie AG, Munich, Germany), by means of atomization via a two-fluid nozzle (pressure 5 bar). The silica loaded in this manner is reacted for 1 h at 80° C. and 2 h at 300° C. in a 100 l dry oven in an air stream of 900 l/h.

The analytical data are shown in table 1.

Example C5 (Comparative Example)

1.89 g of demineralized water and then 6.4 g of dimethyldichlorosilane ($F_T/\%=0$) are added at a temperature of 25° C., under $N_2$ inert gas, to 100 g of hydrophilic silica having a moisture content of less than 1% and an HCl content of less than 100 ppm and having a specific surface area of 150 $m^2/g$ (measured by the BET method according to DIN EN ISO 9227/DIN 66132) (obtainable under the name HDK® V15 from Wacker-Chemie AG, Munich, Germany), by means of atomization via a two-fluid nozzle (pressure 5 bar). The silica loaded in this manner is reacted for 1 h at 80° C. and 2 h at 300° C. in a 100 l dry oven in an $N_2$ stream of 900 l/h.

The analytical data are shown in table 1.

TABLE 1

| Example | % C | % residual SiOH | MN | $F_T/\%$ | $t_2$/min |
|---|---|---|---|---|---|
| 1 | 3.2 | 19 | 73 | 4 | 4.5 |
| C2 | 3.7 | 29 | 77 | 0 | 2.25 |
| 3 | 5.4 | 10 | 74 | 7 | 4.8 |
| 4 | 1.1 | 53 | 35 | 5 | n.d. |
| C5 | 1.0 | 55 | 42 | 0 | n.d. |

Description of the Methods of Analysis
1. Carbon content (% C)
   elemental analysis for carbon; combustion of sample at above 1000° C. in an $O_2$ stream, detection and quantification of the $CO_2$ formed by IR; LECO 244 apparatus
2. Residual content of unmodified silica silanol groups
   method: acid-base titration of the silica suspended in 50:50 water/methanol; titration in the range above the pH range of the isoelectric point and below the pH range of the dissolution of the silica
   untreated silica with 100% SiOH (silica surface silanol groups): SiOH-phil=2 SiOH/nm²
   silylated silica: SiOH-silyl
   silica residual silanol content: % residual SiOH=SiOH-silyl/SiOH-phil.100% (analogous to G. W. Sears, Anal. Chem., 28 (12), (1950), 1981)
3. Methanol number: shaking of a volume of silica with an equal volume of water-methanol mixture
   start with 0% of methanol, silica floats when there is no wetting: mixture with an MeOH content of about 5% by volume higher should be used
   on wetting, silica sinks: proportion of MeOH (%) in water gives MN (MN=methanol number)
4. Relative proportion of T groups ($F_T$): $^{29}$Si solid-state NMR spectrum measured in CPMAS mode
5. Time span up to increase in the starting viscosity by a factor of 2 ($t_2$): 2.3% by weight of the silica to be tested are dispersed in an MDI prepolymer (Desmodur E 210 from Bayer MaterialScience) on a dissolver. 0.33 g of the mixture were applied to the measuring plate of a CAP 2000 Brookfield rheometer with cone 2 and 0.01 g of COTIN 200 tin catalyst were added. The measurement was carried out at a constant rotation speed of 50 min$^{-1}$ at a temperature of 80° C. The measurement was stopped as soon as irregular behavior due to wall gliding effects of the crosslinked sample was observable. Data points are recorded every 5 s.

The invention claimed is:

1. A silica modified with D and T groups of the respective formulae (I) and (II)

$$R_2Si(O-)_2 \quad (I)$$

$$RSi(O-)_3 \quad (II)$$

in which
R is a monovalent, optionally mono- or polyunsaturated, optionally branched hydrocarbon radical having 1 to 24 C atoms,
the relative proportion $F_T$ of T groups comprising $T^1$, $T^2$ and $T^3$ groups, based on the total T organosilicon groups and D organosilicon groups of the silica, $F_T=I_T/I_T+I_D$) where $I_T$ and $I_D$ are the integrated signal intensities of T and D groups, respectively, as measured by $^{29}$Si NMR spectroscopy being greater than 0.001 and less than 0.20,
the relative proportion of $T^1$ groups ($F_{T1}=I_{T1}/(I_{T1}+I_{T2}+I_{T3})$) being less than 0.1 and the relative proportion of the $T^2$ groups ($F_{T2}=I_{T2}/(I_{T1}+I_{T2}+I_{T3})$) being greater than 0.05, a T group being a monoalkyltrisilyloxy group R—Si(O—)$_3$, the superscript number indicating the number of siloxane bonds, so that
$T^1$ is R—Si(OR')$_2$—O—Si
$T^2$ is R—Si(OR')(—O—Si)$_2$
$T^3$ is R—Si(—O—Si)$_3$,
where R is as defined above, and R' is an alkyl group or a hydrogen atom, and where I is the integrated signal intensity of the respective $T^1$, $T^2$, or $T^3$ group as measured by $^{29}$Si NMR spectroscopy.

2. The silica of claim 1, wherein radicals R comprise methyl, ethyl, propyl, hexyl, octyl, n-dodecyl, n-hexadecyl or n-octadecyl radicals.

3. The silica of claim 1, wherein dimethylsilyldioxy groups $(CH_3)_2Si(O-)_2$ and methylsilyltrioxy groups $CH_3Si(O-)_3$ are present on the silica surface.

4. The silica of claim 1, wherein the relative proportion of the T groups comprising $T^1$, $T^2$ and $T^3$ groups, based on the total organosilicon groups of the silica, is from 0.01 to 0.1.

5. The silica of claim 1, wherein the proportion of $T^1$ groups ($F_{T1}=I_{T1}/(I_{T1}+I_{T2}+I_{T3})$) is less than 0.05.

6. The silica of claim 1, wherein the relative proportion of $T^2$ groups ($F_{T2}=I_{T2}/(I_{T1}+I_{T2}+I_{T3})$) is from 0.05 to 0.75.

7. The silica of claim 5, wherein the relative proportion of $T^2$ groups ($F_{T2}=I_{T2}/(I_{T1}+I_{T2}+I_{T3})$) is from 0.05 to 0.75.

8. A process for the preparation of a silica of claim 1, modified with groups of the formula (I) and (II), comprising modifying hydrophilic silica with silanes of the formula III $$R_2SiX_2 \quad (III)$$

in which X is halogen, OH or OR,
or with siloxanes of the formula (IV)

$$(R_aSiX_b(O-)_{1/2})(Si(R)_2(O-)_{2/2})_n(-O)_{1/2}X_bSiR_a)$$

where
a is 2 or 3,
b is 0 or 1, with the proviso that a+b=3,
n is from 1 to $10^4$, the viscosity of the polysiloxanes used being greater than 0.5 mPa·s at a temperature of 25° C.,
or with any mixtures of silanes of the formula (III) and/or siloxanes of the formula (IV), and wherein the silanes or siloxanes are added in liquid form to pulverulent silica, with the proviso that modification is effected by reacting the silica with the silanes and/or siloxanes at below 400° C. under oxidizing conditions.

9. A method for controlling the flow properties of a coating, adhesive or sealant comprising incorporating into the coating, adhesive or sealant a modified silica of claim 1.

10. A method for controlling the flow properties of a coating, adhesive or sealant comprising incorporating into the coating, adhesive or sealant a modified silica prepared by the process of claim 8.

11. A method for improving the storage stability of a catalytically crosslinking coating, adhesive or sealant comprising incorporating the modified silica of claim 1 into a catalytically crosslinkable coating, adhesive or sealant.

12. A method for improving the storage stability of a catalytically crosslinking coating, adhesive or sealant comprising incorporating the modified silica produced by the process of claim 8 into a catalytically crosslinkable coating, adhesive or sealant.

13. The process of claim 8, comprising loading the silica with the silanes of the formula (III) and/or the siloxanes of the formula (IV) at a temperature in the range of 20° C. to 150° C., and the following loading, reacting the silica in an oxidizing atmosphere at a temperature of 100-350° C.

14. The process of claim 8, wherein the oxidizing atmosphere comprises nitrous oxide or a gas containing at least 5 volume percent oxygen.

15. A process for the preparation of a silica of claim 1, modified with groups of the formula (I) and (II), comprising modifying the hydrophilic silica with siloxanes of the formula (IV)

$$(R_aSiX_b(O-)_{1/2})(Si(R)_2(O-)_{2/2})_n(-O)_{1/2}X_bSiR_a)$$

where X is halogen, OH, or OR,
a is 2 or 3,
b is 0 or 1, with the proviso that a+b=3,
n is from 1 to $10^4$, the viscosity of the polysiloxanes used being greater than 0.5 mPa·s at a temperature of 25° C., with the proviso that modification is effected at below 400° C. under oxidizing conditions, and wherein the siloxanes are added in liquid form to pulverulent silica.

16. The process of claim 8, wherein the oxidizing conditions are established by reacting the silica with the siloxanes in an atmosphere containing at least 10 volume percent oxygen.

17. The process of claim 16, wherein the atmosphere is air.

18. The process of claim 8, wherein the oxidizing conditions are established by reacting the silica with the siloxanes in an atmosphere containing nitrous oxide.

* * * * *